United States Patent [19]
Kawaguchi et al.

[11] Patent Number: 5,579,187
[45] Date of Patent: Nov. 26, 1996

[54] TAPE LOADING MECHANISM WITH DRUM BASE

[75] Inventors: Mitsuhiro Kawaguchi; Yoshiki Nagaoka, both of Nagaokakyo, Japan

[73] Assignee: Mitsubishi Denki Kabushiki Kaisha, Japan

[21] Appl. No.: 278,144

[22] Filed: Jul. 21, 1994

[30] Foreign Application Priority Data

Aug. 5, 1993 [JP] Japan .................................. 5-194777

[51] Int. Cl.⁶ .............................. G11B 5/027; G11B 5/52; G11B 21/04; G11B 21/18
[52] U.S. Cl. .............................. 360/85; 360/107; 242/338
[58] Field of Search ....................... 360/85, 107; 242/338

[56] References Cited

U.S. PATENT DOCUMENTS

| | | | |
|---|---|---|---|
| 4,556,922 | 12/1985 | Erhart | 360/85 |
| 4,796,115 | 1/1989 | Ohshima et al. | 360/85 |
| 5,021,908 | 6/1991 | Morimoto et al. | 360/107 |
| 5,168,399 | 12/1992 | Kano et al. | 360/85 |
| 5,363,257 | 11/1994 | Matsuoka | 360/85 |

FOREIGN PATENT DOCUMENTS

| | | |
|---|---|---|
| 4011617 | 4/1989 | Germany. |
| 2123202 | 1/1984 | United Kingdom. |

OTHER PUBLICATIONS

Voss, et al., "Knaurs Handwerksbuch", pp. 298–299.
Haack; "Kunststoffe Hoechst", Sonderdruck 6225; pp. 1–6.

*Primary Examiner*—John H. Wolff
*Assistant Examiner*—Adriana Giordana

[57] ABSTRACT

In a tape loading mechanism, a guide groove is formed in a main plate and a drum base that defines the path of a movable tape guide. Each of the main plate and the drum base is provided with a step portion in the thickness direction at a joining area where the drum base is joined to the main plate. These step portions overlap with each other. By using this joining method, a die cast drum base can be thinned so that the dimensional accuracy is improved and a movable tape guide can be moved smoothly along the guide groove.

12 Claims, 13 Drawing Sheets

TAPE LOADING MECHANISM WITH DRUM BASE

BACKGROUND OF THE INVENTION

1. Field of the Invention

The invention relates to a tape loading mechanism for a magnetic recording/reproducing apparatus such as a video cassette recorder, and more particularly to a structure of a guide groove for guiding a movable tape guide.

2. Description of Related Art

FIG. 1 is a schematic plan view showing a loading state in a video cassette recorder (hereinafter, abbreviated as "VCR"), and FIG. 2 is a schematic plan view showing an unloading state. In the figures, numeral 10 designates a cassette in which a magnetic tape 3 is housed, and which comprises a supply reel 11 for supplying the magnetic tape 3, and a take-up reel 12 for taking up the magnetic tape 3. A rotary drum 1 having video heads 1a and 1b is located in front of the cassette 10. Guide rollers 4a and 4b are disposed at the both sides of the rotary drum 1, respectively. An erase head 5 is disposed between the guide roller 4a and the cassette 10. An audio erase head 6, and an audio signal and control signal head 7 are disposed between the guide roller 4b and the cassette 10. Moreover, a movable pinch roller 8, and a capstan shaft 9 are located in the vicinity of a take-up opening of the cassette 10.

In the loading state, the magnetic tape 3 is wound on the peripheral face of the rotary drum 1 by movable tape guides 3a to 3d. The recording and reproducing processes are conducted under this state. In the unloading state, the magnetic tape 3 is housed in the cassette 10 by the movable tape guides 3a to 3d.

FIG. 3 is a plan view showing a tape loading mechanism of the prior art, and FIG. 4 is a bottom view of the mechanism. The rotary drum 1 is mounted at an adequate position of a main plate 28 which is produced by a die cast process. Guide grooves 23 and 24 along which movable tape guides 21 and 22 slidingly run are formed in the main plate 28 so as to surround the both sides of the rotary drum 1. The movable tape guides 21 and 22 are moved by arm loads 26 and 27 which are rotated and driven by an arm gear load 25.

When the magnetic tape 3 is to be set to the loading state by the movable tape guides 21 and 22, the arm loads 26 and 27 are rotated by the arm gear load 25, so that the movable tape guides 21 and 22 are moved upward in the figure. In this movement, the movable tape guides 21 and 22 travel along the guide grooves 23 and 24. The movable tape guides 21 and 22 are moved each time when a recording or reproducing process is conducted in the VCR, and therefore are required to be structured in a high dimensional accuracy so that they are smoothly moved without rattling. When the magnetic tape 3 is to be wound on the rotary drum 1 by movable tape guides 21 and 22, furthermore, a sufficiently high dimensional accuracy must be attained.

Generally, a die cast process has a feature that a required dimensional accuracy can easily be attained and a higher dimensional accuracy is attained as a thinner die cast product is formed. However, such a die cast process involves a higher cost. When the whole of the main plate 28 is produced by a die cast process, therefore, the cost of a product is increased under the state of the art.

In order to reduce the cost, a countermeasure is taken in which the main plate 28 is made of a metal plate such as an iron plate. However, the drum base portion for supporting the rotary drum 1 must be produced by a die cast process so that a sufficiently high dimensional accuracy is attained. In order to allow the magnetic tape 3 to be accurately wound on the rotary drum 1 in the loading process, furthermore, the guide grooves 23 and 24 which correspond to the positions of the movable tape guides 21 and 22 in the loading process are required to be formed in a part of the drum base portion.

As a result, the guide grooves must be formed, ranging from the main plate made of a metal to the drum base produced by a die cast process. In this case, it produces a problem in that it is very difficult to smoothly move the movable tape guides. FIG. 5 is an enlarged section view showing an example of a joining area of the prior art. In the joining area, a main plate made of a metal, and a drum base produced by a die cast process are joined to each other. In such a structure wherein only a butt joint of the main plate 41 and the drum base 42 is formed, it is impossible to accurately join the drum base 42 to the main plate 41.

In the case where a molding member is formed by using a metal plate in a highly accurate manner, it is general to apply an outsert 41b to the metal plate. Therefore, the thickness of the drum base 42 must coincide with a sum of the thicknesses of the metal plate 41a and the outsert 41b. Accordingly, the thickness of the drum base 42 must be increased so that the feature of the die casting process fails to be sufficiently utilized. This produces another problem in that a high dimensional accuracy cannot be attained.

SUMMARY OF THE INVENTION

The invention has been conducted in order to solve the above-discussed problems. It is an object of the invention to provide a tape loading mechanism which, even in the case where a guide groove is formed, ranging from a main plate to a drum base produced by a die cast process, a movable tape guide can smoothly be moved along the guide groove and a high dimensional accuracy can be attained.

The tape loading mechanism of the invention has a configuration in which a guide groove is formed in a main plate and a drum base, each of the main plate and the drum base is provided with a step portion in the thickness direction at a joining area where the drum base is joined to the main plate, and the step portions overlap with each other. The joining area of the drum base is formed by reducing the thickness, and the joining area of the main plate can be formed by applying an outsert. According to this configuration, the joining area of the die cast product is thinned so that the dimensional accuracy is improved, and the movable tape guide can smoothly be moved.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing its embodiment.

Figure 6:
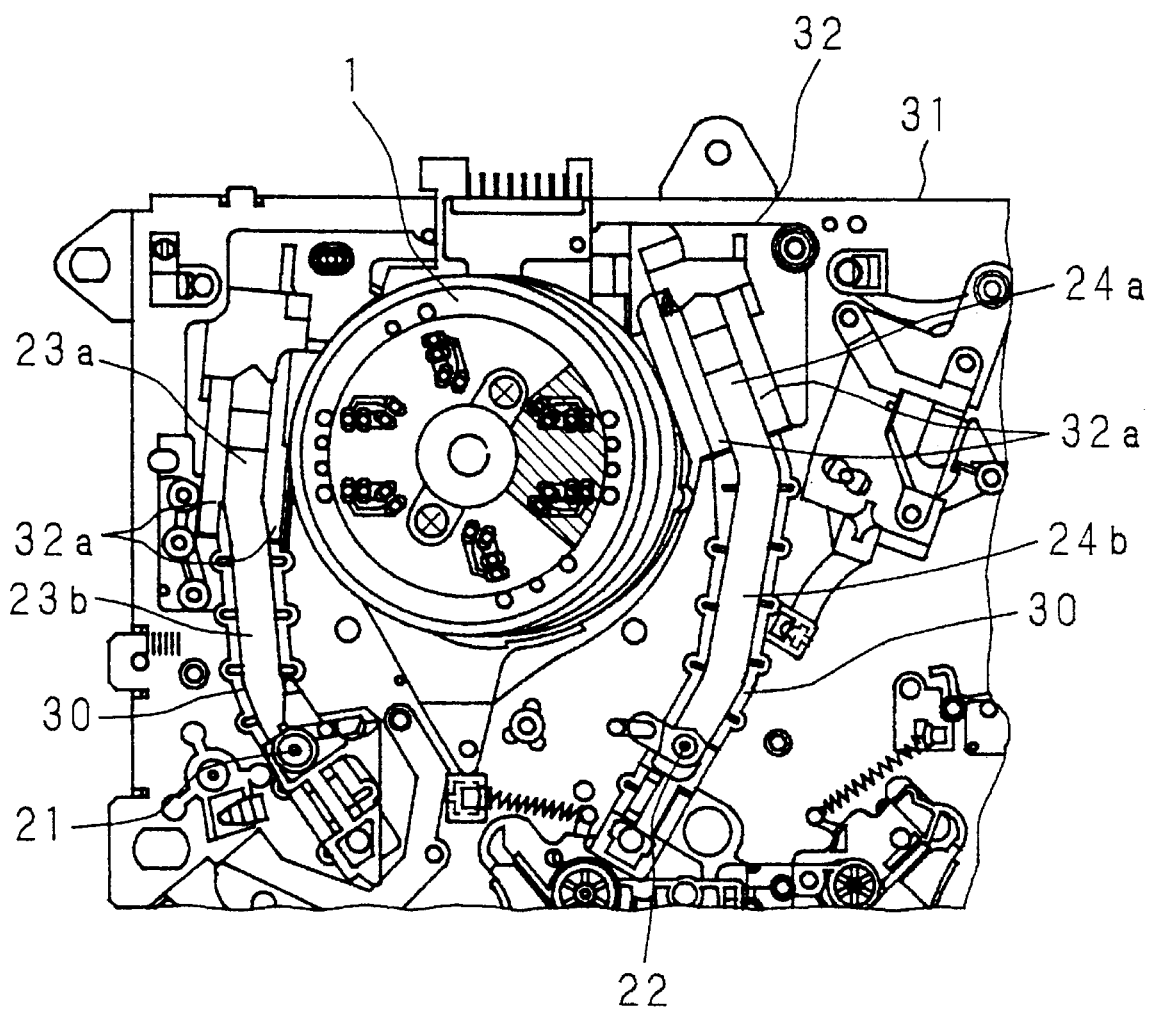
FIG. 6 is a plan view showing a tape loading mechanism of the invention.
Figure 7:
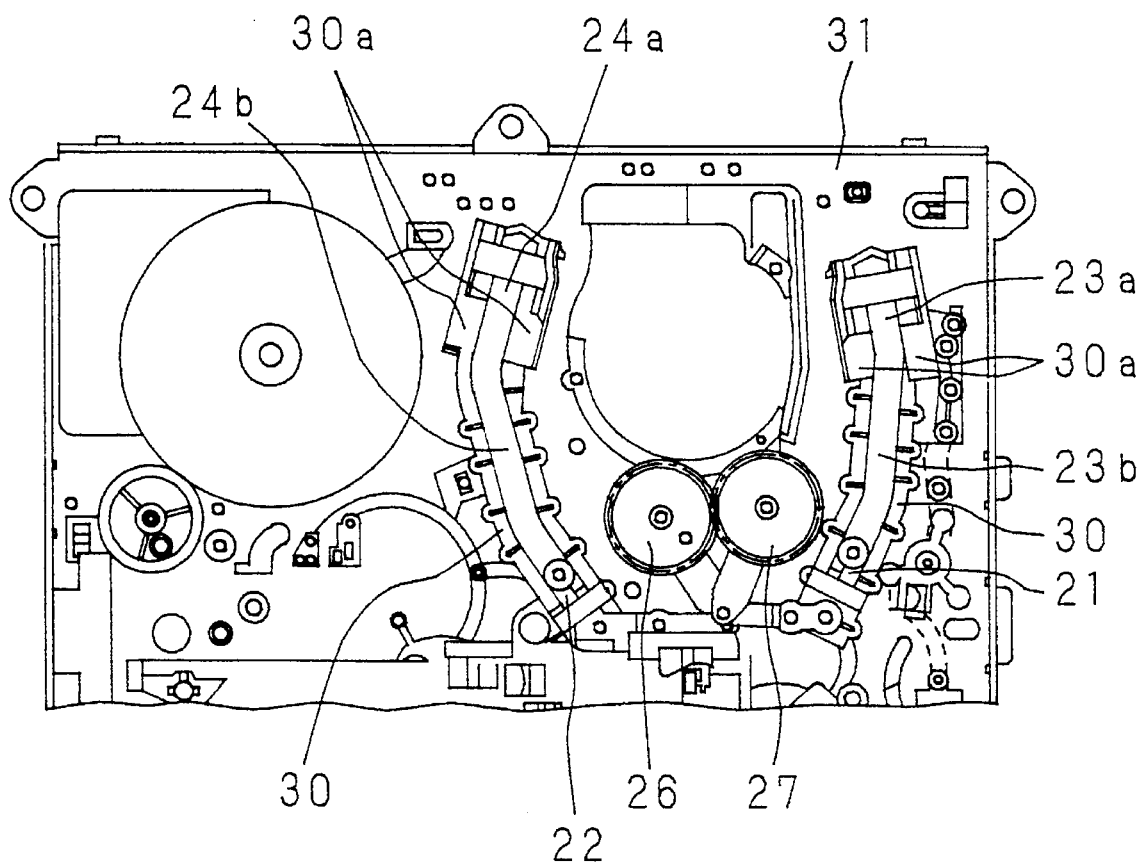
FIG. 7 is a bottom view of the tape loading mechanism shown in FIG. 6.
Figure 8:
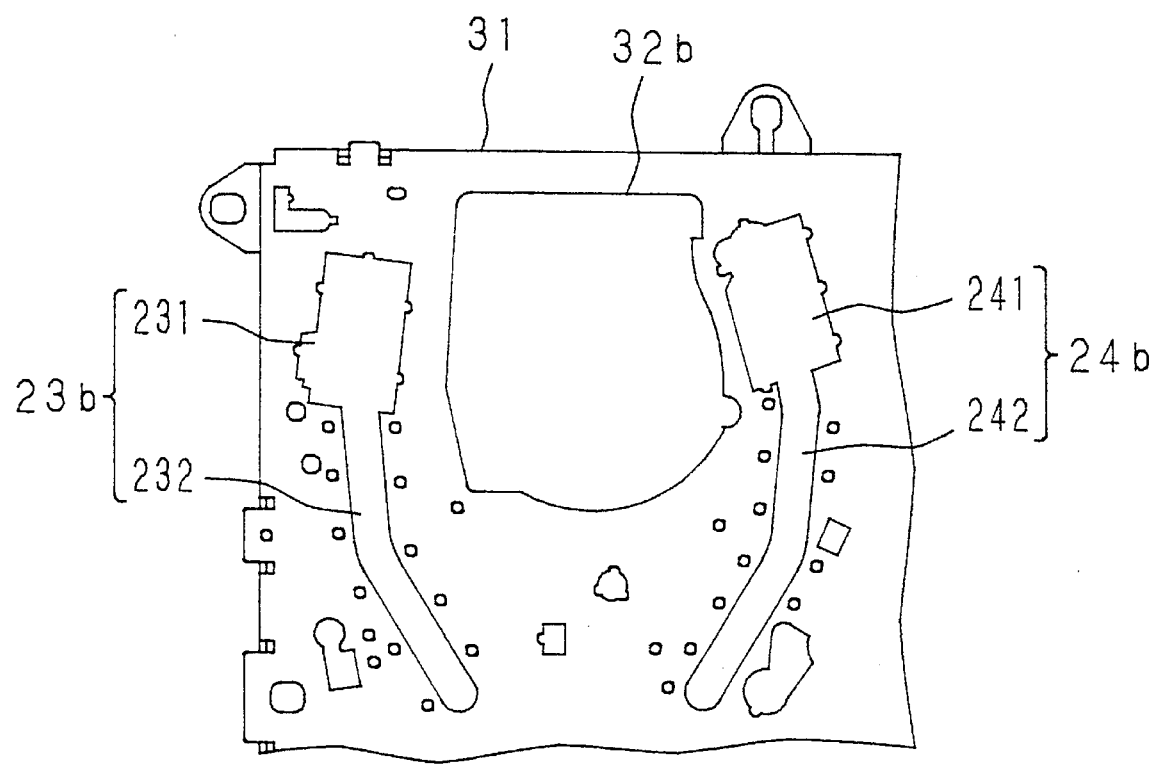
FIG. 8 is a plan view showing a main plate on which a process of opening guide grooves has been conducted.
Figure 9:
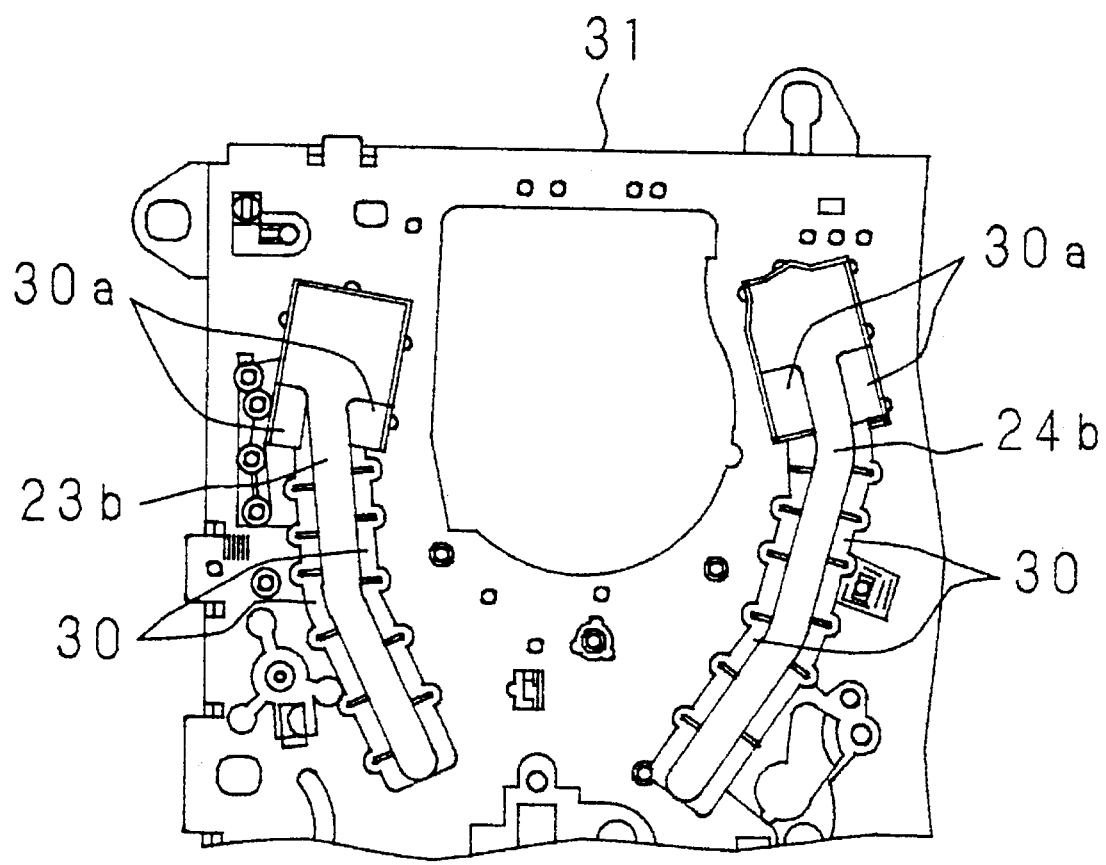
FIG. 9 is a plan view showing a state in which an outsert process has been conducted on the main plate shown in FIG. 8.
Figure 10:
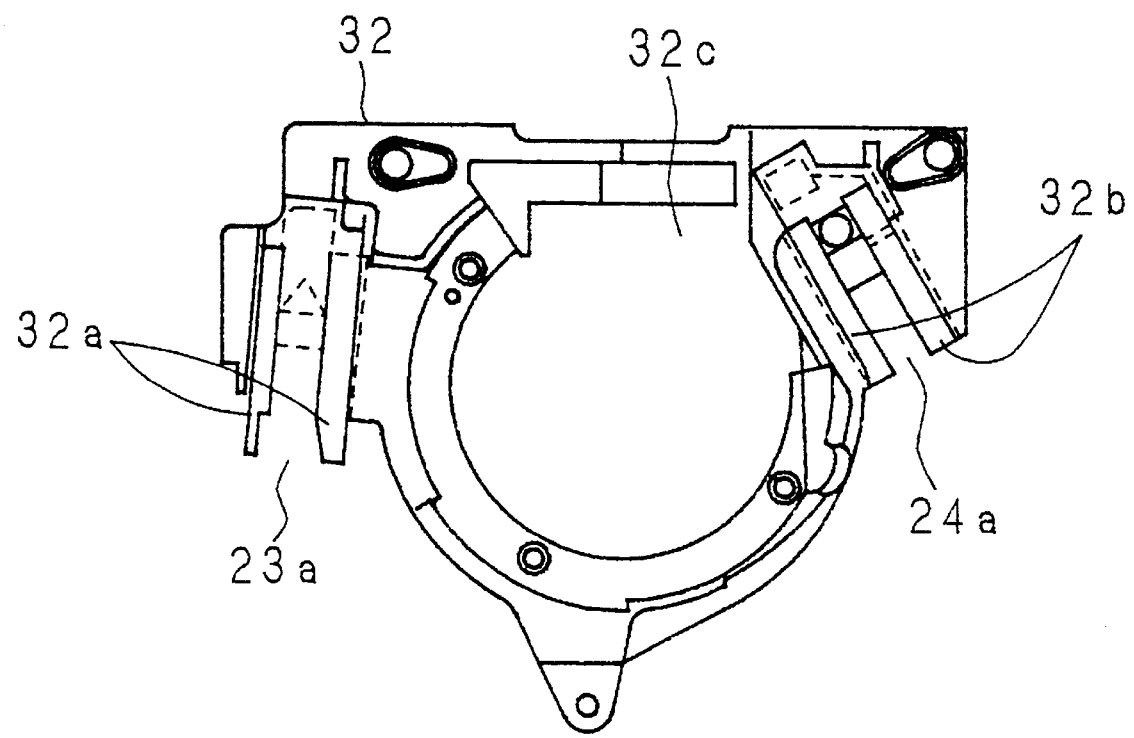
FIG. 10 is a plan view showing a drum base.

FIG. 6 is a plan view showing a tape loading mechanism of the invention, FIG. 7 is a bottom view of the tape loading mechanism, FIG. 8 is a plan view showing a main plate on which a process of opening guide grooves has been conducted, FIG. 9 is a plan view showing a state in which an outsert process has been conducted on the main plate shown in FIG. 8, and FIG. 10 is a plan view showing a drum base on which a rotary drum is to be mounted.

In FIG. 6, numeral 31 designates a main plate made of an iron plate. A drum base 32 on which a rotary drum 1 is to be mounted is attached at an adequate position of the main plate 31. Guide grooves 23 and 24 along which movable tape guides 21 and 22 slidingly run are formed in the main plate 31 so as to surround the rotary drum 1 from the both sides. The movable tape guides 21 and 22 are moved by arm loads 26 and 27 as shown in FIG. 7.

In the main plate 31, as shown in FIG. 8, opened are a drum base hole 32b to mount the drum base 32, and guide holes 23b and 24b to form the guide grooves 23 and 24. The guide hole 23b (24b) is a slot which is curved along the drum base hole 32b. In the guide hole 23b (24b), the portion which is in the side of the drum base hole 32b is formed as a wide portion 231 (241), and the remaining portion as a narrow portion 232 (242).

As shown in FIGS. 8 and 9 the guide hole 23b (24b) is provided with an outsert 30 which elongates over the narrow portion 232 (242) and reaches a predetermined position of the wide portion 231 (241). The portion of the outsert 30 in the wide portion 231 (241) is formed as an extended portion 30a which will be used for joining with the drum base 32. The outserts 30 are obtained by integrally molding a metal and a resin such as plastics, and suitable for the case where a highly accurate molding member is to be formed.

As shown in FIG. 10, the drum base 32 has a hole 32c at the center into which the rotary drum 1 is to be fitted, and nick portions 23a and 24a at positions which correspond to the wide portions 231 and 241 when the drum base 32 is mounted on the main plate 31. Formed in the nick portions 23a and 24a, are extended portions 32a and 32b which overlap with the extended portions 30a and are connected thereto.

Figure 11:
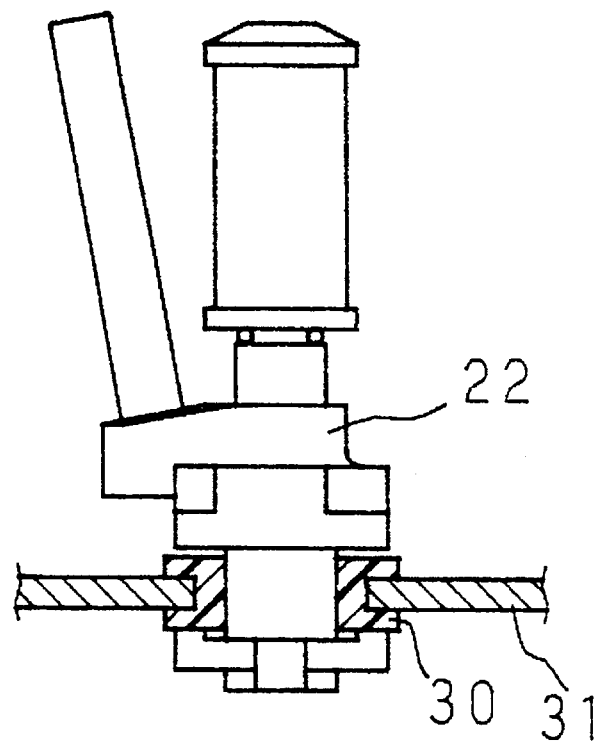
FIG. 11 is a section view as seen from the front side and showing the main portion of an area where a movable tape guide slidingly contacts with the outsert applied to the main plate.
Figure 12:
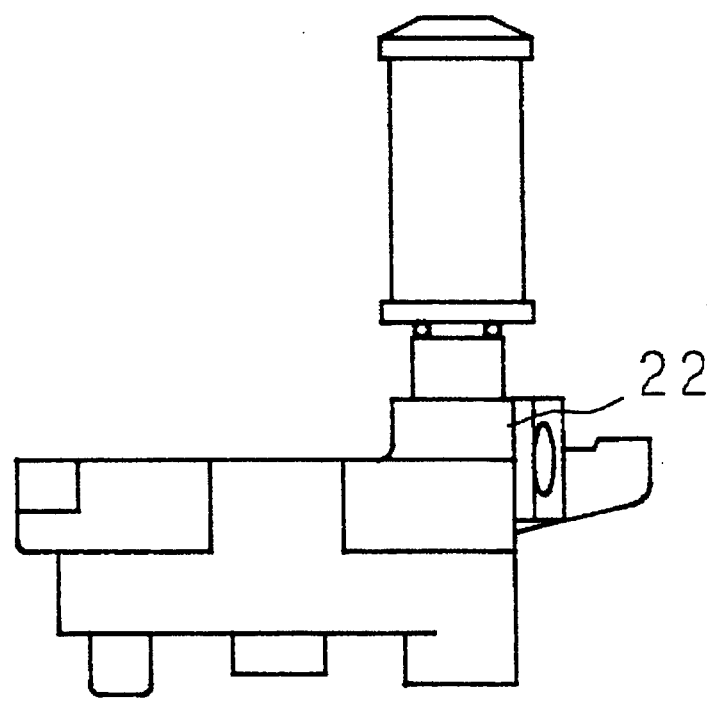
FIG. 12 is a side view showing an area where the movable tape guide slidingly contacts with the outsert applied to the main plate.

FIG. 11 is a section view as seen from the front side and showing the main portion of an area where the movable tape guide 22 slidably contacts with the outsert 30 applied to the main plate 31, and FIG. 12 is a side view of the sliding portion. The movable tape guide 22 has recess portions to engage with the main plate 31 having outsert 30 on both sides of a lower part. In FIG. 12 the main plate 31 is not shown.

Figure 13:
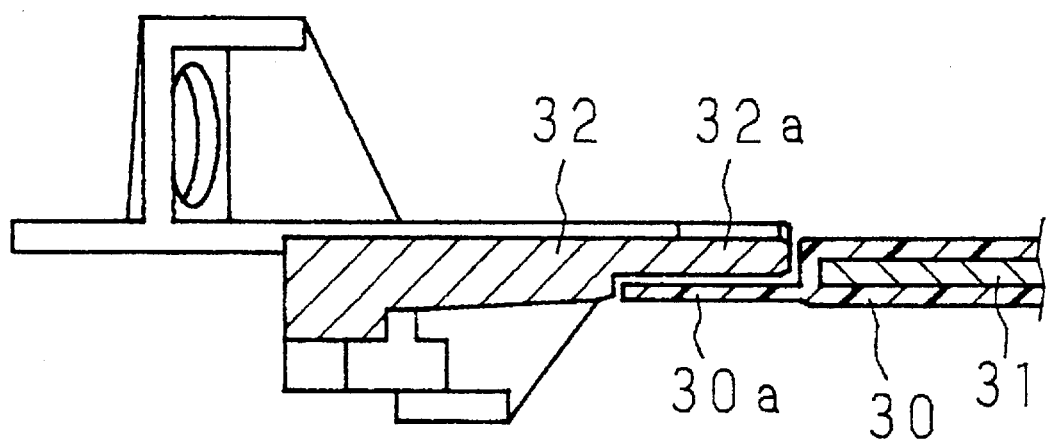
FIG. 13 is a section view showing the main portion of a joining area of the main plate and the drum base shown in FIGS. 6 and 7.

FIG. 13 is a longitudinal section view showing a joining area of the main plate 31 and the drum base 32 in the guide grooves 23 and 24. The outsert 30 is formed so as to vertically sandwich the main plate 31, and the lower portion of the outsert 30 is extended. The thickness of the extended portion 32a of the drum base 32 is reduced by a degree corresponding to that of the lower portion of the outsert 30.

Since a higher dimensional accuracy is attained as a thinner die cast product is formed, the extended portion 32a can be thinned in this way to form a step portion, and the accuracy in the loading state can easily be attained. Specifically, a metal plate of a thickness of 1.6 mm is used as the main plate 31, and an outsert 30 of a thickness of 1.0 mm is applied to the upper, lower and side faces of the metal plate, resulting in that the total thickness reaches 3.6 mm. The drum base 32 has a thickness of 3.6 mm by totalling a thickness of 2.6 mm of the extended portion 32a and a depth of the step (that is, the thickness of 1.0 mm of the extended portion 30a of the outsert 30).

Next, the operation will be described. FIGS. 6 and 7 show the unloaded state in which the movable tape guides 21 and 22 are positioned at the ends of the guide grooves 23 and 24 which are in the side of the narrow portions 232 and 242. When the arm loads 26 and 27 are driven, the movable tape guides 21 and 22 are moved upward along the guide grooves 23 and 24 to which the outserts 30 are applied, and are stopped at the nick portions 23a and 24a formed in the drum base 32, so that a magnetic tape is wound on the rotary drum 1, with the result that the mechanism enters the loaded state.

Figure 1:
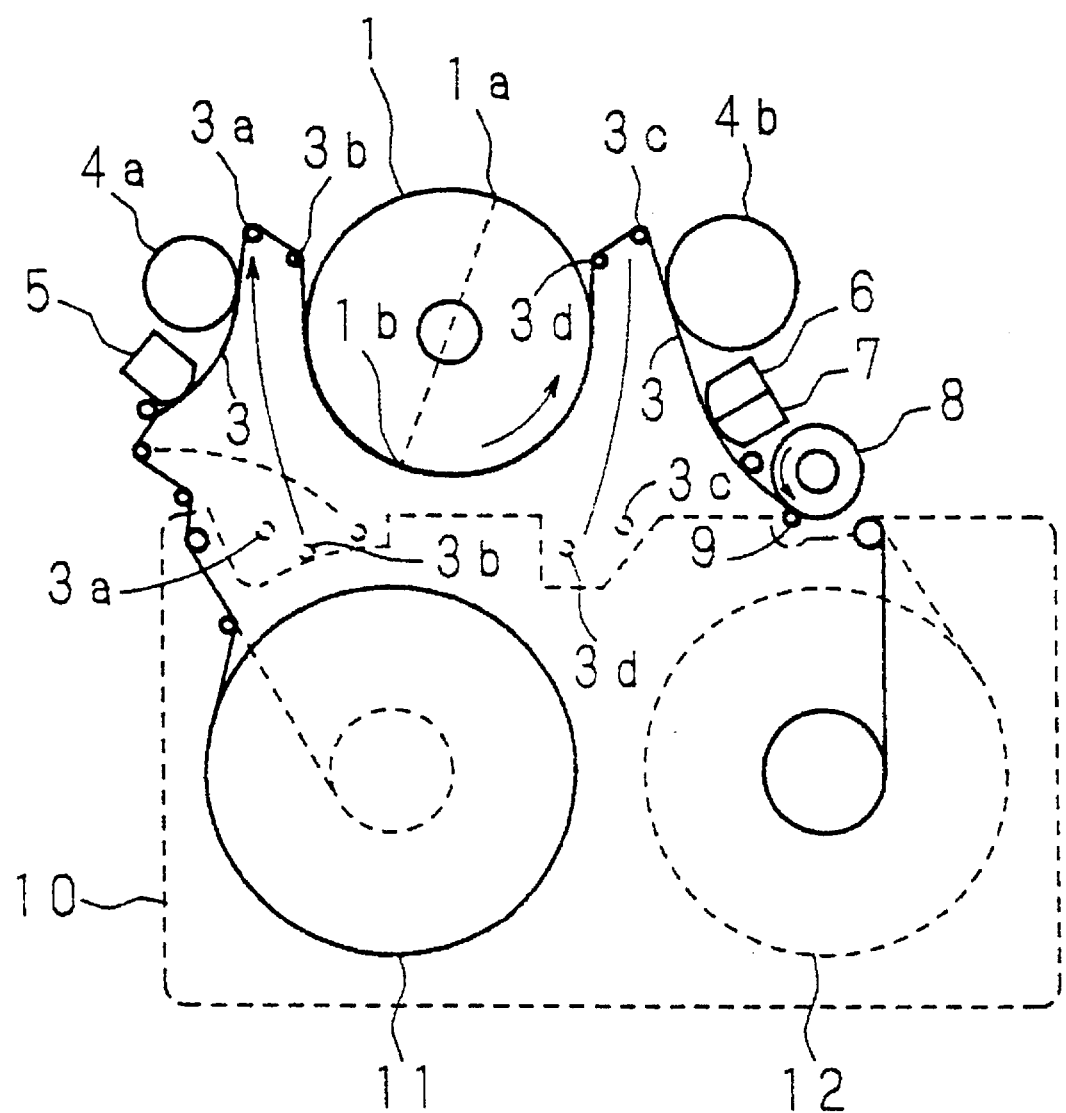
FIG. 1 is a schematic plan view showing the loading state in a video cassette recorder.
Figure 2:
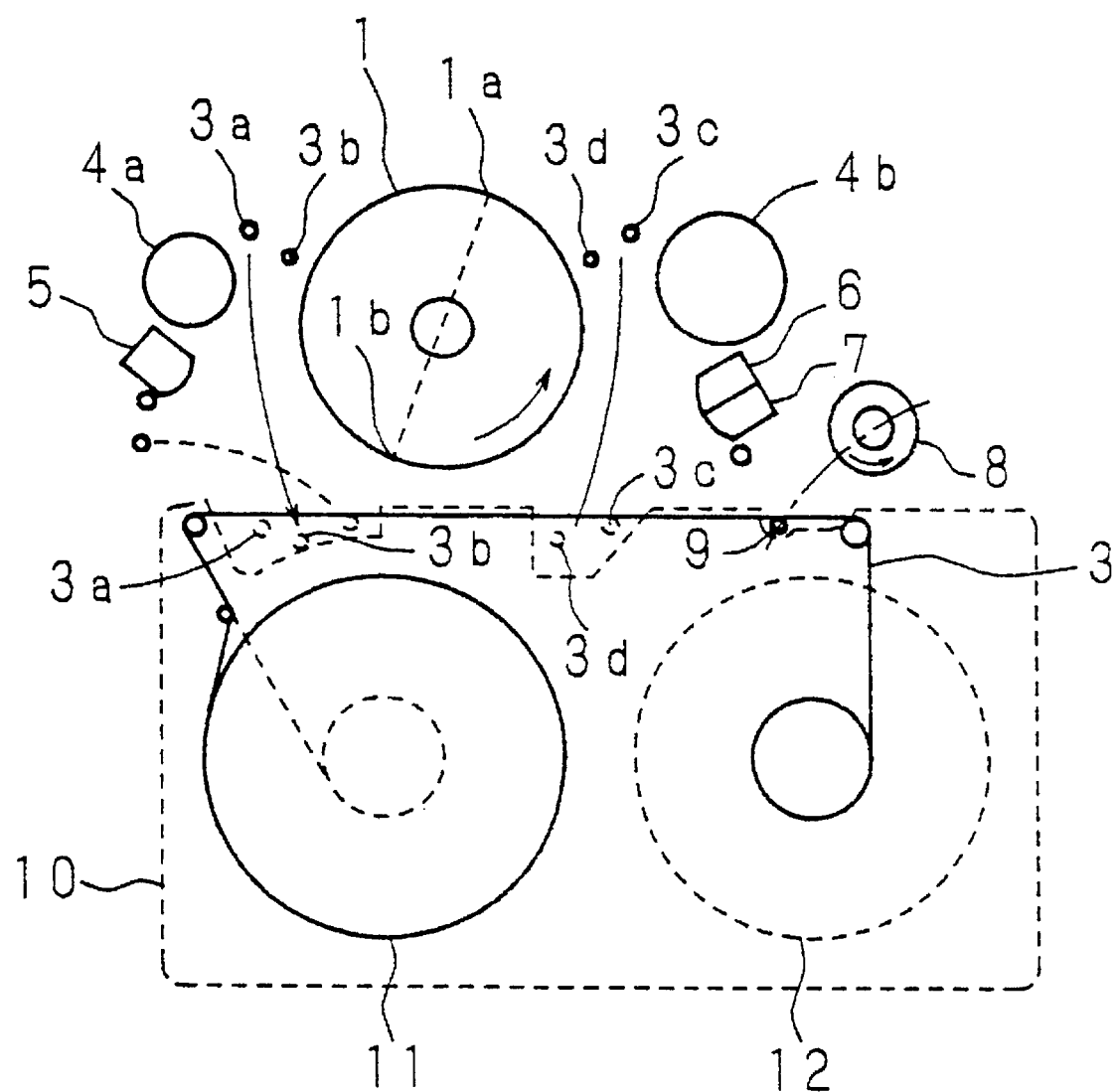
FIG. 2 is a schematic plan view showing the unloading state.
Figure 3:
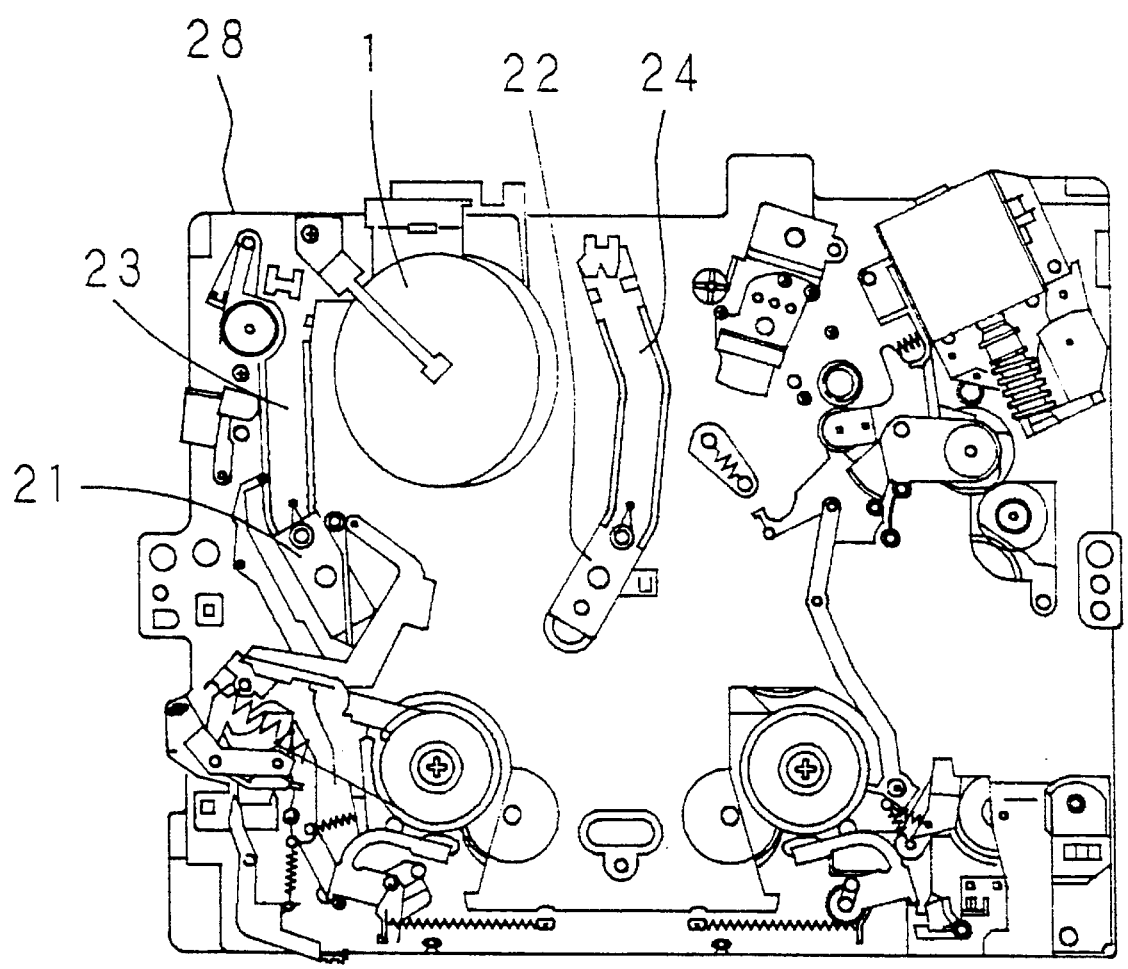
FIG. 3 is a plan view showing a conventional tape loading mechanism.
Figure 4:
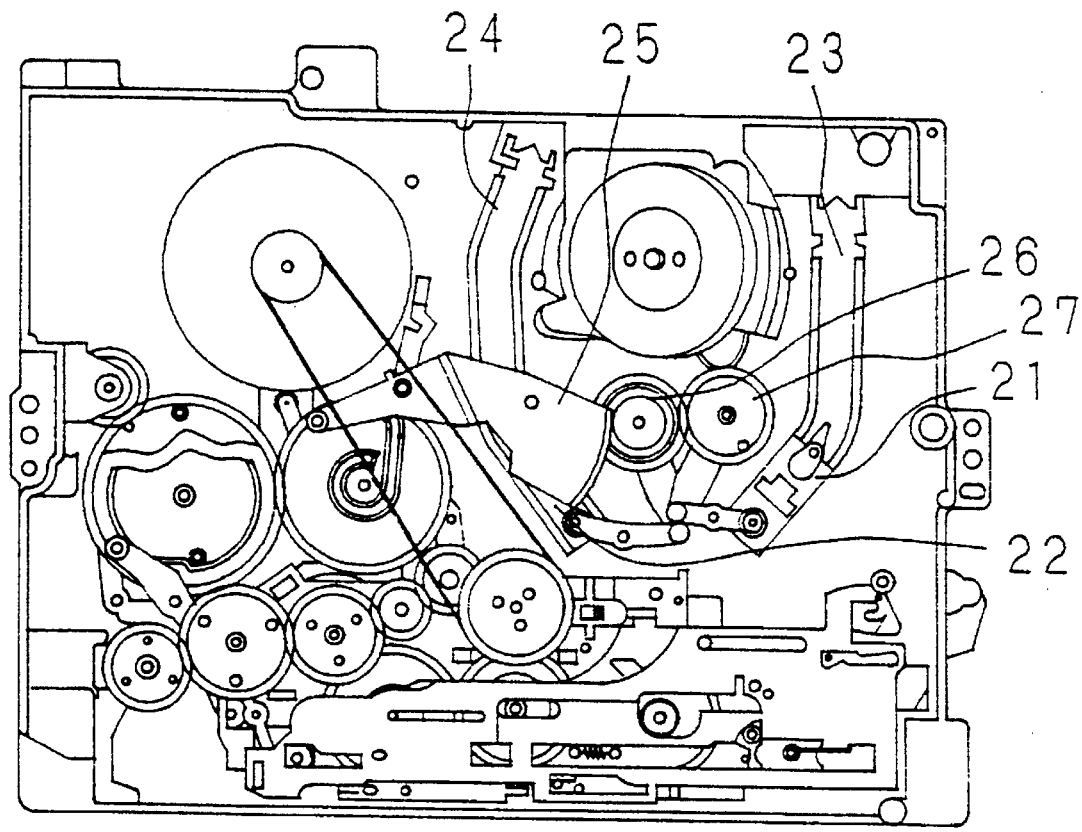
FIG. 4 is a bottom view of the tape loading mechanism shown in FIG. 3.
Figure 5:
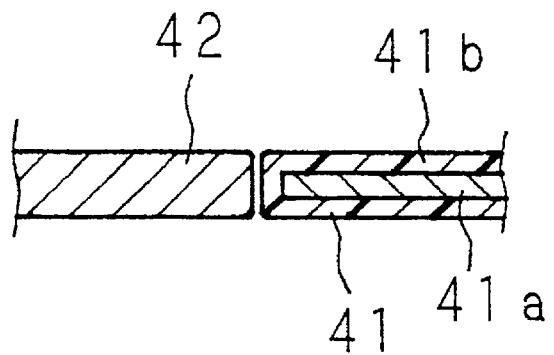
FIG. 5 is an enlarged section view showing the main portion of a joining area in the prior art where a main plate and a drum base are joined to each other.

In this process, the movable tape guides 21 and 22 are smoothly moved from the respective outserts 30 to the drum base 32. Also, the movable tape guides 21 and 22 are smoothly moved in the reverse direction, or from the drum base 32 to the respective outserts 30. The mechanism has a sufficient durability against moving operations which are frequently repeated. As described above, a higher dimensional accuracy is attained as a thinner die cast product is formed. In the configuration shown in FIG. 13, the drum base 32 can be made thinner than that used in the configuration shown in FIG. 5, and therefore also the movable tape guides 21 and 22 in the loading state can attain a high dimensional accuracy.

As described above, according to the invention, a guide groove is formed in a main plate and a drum base, each of the main plate and the drum base is provided with a step portion in the thickness direction at a joining area where the drum base is joined to the main plate, and the step portions overlap with each other. Therefore, the joining area of the die cast product can be thinned so that the dimensional accuracy is improved, and a movable tape guide can smoothly be moved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A tape loading mechanism for loading a magnetic tape, comprising:

a rotary drum having at least one recording/reproducing head;

a drum base on which said rotary drum is mounted including a drum base step portion formed in a thickness direction at a joining area;

a main plate on which said drum base is mounted and joined to at the joining area, said main plate including a main plate step portion formed in a thickness direction at the joining area which overlaps with the drum base step portion;

a movable tape guide for winding the magnetic tape on said rotary drum, and a guide grove formed, ranging from said drum base to said main plate, to guide said movable tape guide, wherein a smooth joint is formed by the main plate step portion and the drum base step portion which permits precise movement of said movable tape guide along said guide groove.

2. A tape loading mechanism according to claim 1, wherein said drum base is produced by a die cast process.

3. A tape loading mechanism according to claim 1, wherein said main plate is comprised of metal.

4. A tape loading mechanism according to claim 1, wherein an outsert is applied to said joining area of said main plate.

5. A tape loading mechanism according to claim 4, wherein said outsert sandwiches said main plate in the thickness direction, a portion of said outsert which is on one of side faces of said main plate is elongated to form said step portion, and said drum base is provided with said step portion so as to fit in said outsert.

6. A tape loading mechanism according to claim 4, wherein said outsert is comprised of an integrally molded metal and resin.

7. A method of constructing a tape loading mechanism for a magnetic tape wherein the tape loading mechanism includes a drum base on which a rotary drum is mounted; a movable tape guide for winding the magnetic tape on said rotary drum; a main plate having a top face, a bottom face and side faces on which said drum base is mounted and a guide groove for guiding said movable tape guide, said method of constructing comprising:

providing a step portion in a thickness direction in said drum base to form a joining area on said drum base, providing a step portion in a thickness direction in said main plate to form a joining area on said main plate, wherein said step portions substantially overlap each other, and joining said main plate and said drum base at said joining areas wherein said step portions provide a smooth joint between said drum base and said main plate which permits precise movement of the movable tape guide along the guide groove.

8. A method of constructing a tape loading mechanism according to claim 7, further comprising using a die cast process to form said drum base.

9. A method of constructing a tape loading mechanism according to claim 7, further comprising constructing said main plate with metal.

10. A method of constructing a tape loading mechanism for a magnetic tape according to claim 7, further comprising applying an outsert to the joining area on said main plate.

11. A method of constructing a tape loading mechanism for a magnetic tape according to claim 10, further comprising sandwiching said main plate in the thickness direction with said outsert, providing an elongated step portion on one of the side faces of said main plate, and providing said drum base with a step portion so as to fit in said outsert.

12. A method of constructing a tape loading mechanism according to claim 10, further comprising integrally molding a metal and a resin to form said outsert.

* * * * *